United States Patent
VanBlon et al.

(10) Patent No.: US 10,789,077 B2
(45) Date of Patent: Sep. 29, 2020

(54) DEVICE SETTING CONFIGURATION

(71) Applicant: Lenovo (Singapore) Pte. Ltd., Singapore (SG)

(72) Inventors: Russell Speight VanBlon, Raleigh, NC (US); Aaron Michael Stewart, Raleigh, NC (US); Joshua Neil Novak, Wake Forest, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 72 days.

(21) Appl. No.: 16/105,474

(22) Filed: Aug. 20, 2018

(65) Prior Publication Data
US 2020/0057657 A1 Feb. 20, 2020

(51) Int. Cl.
*G06F 9/24* (2006.01)
*G06F 9/445* (2018.01)
*G06F 9/4401* (2018.01)

(52) U.S. Cl.
CPC .......... *G06F 9/4451* (2013.01); *G06F 9/4401* (2013.01)

(58) Field of Classification Search
CPC ................................. G06F 44/51; G06F 9/4451
USPC ............................................................. 713/1
See application file for complete search history.

(56) References Cited

U.S. PATENT DOCUMENTS

| | | | | |
|---|---|---|---|---|
| 7,152,099 | B1* | 12/2006 | Arens | H04L 29/12235 709/220 |
| 2004/0267971 | A1* | 12/2004 | Seshadri | H04M 1/72563 710/8 |
| 2008/0294655 | A1* | 11/2008 | Picault | G06Q 10/10 |
| 2010/0144318 | A1* | 6/2010 | Cable | H04L 67/306 455/412.1 |
| 2014/0006512 | A1* | 1/2014 | Huang | G06Q 30/02 709/204 |
| 2014/0315585 | A1* | 10/2014 | Pollari | G06Q 50/01 455/456.3 |
| 2015/0040200 | A1* | 2/2015 | Gantman | G06F 21/44 726/7 |
| 2015/0046830 | A1* | 2/2015 | Formo | H04W 76/10 715/740 |
| 2017/0200007 | A1* | 7/2017 | Drummond | G06F 21/575 |

\* cited by examiner

*Primary Examiner* — Volvick Derose
(74) *Attorney, Agent, or Firm* — Ference & Associates LLC

(57) ABSTRACT

One embodiment provides a method, including: identifying, using a processor of an information handling device, a presence of at least one other device; requesting, from the at least one other device, configuration information; receiving, at the information handling device, the configuration information; and configuring, responsive to the receiving, one or more settings on the information handling device. Other aspects are described and claimed.

16 Claims, 3 Drawing Sheets

DEVICE SETTING CONFIGURATION

BACKGROUND

Settings on newly obtained information handling devices ("devices"), for example smart phones, tablet devices, smart speakers, digital media players, laptop and personal computers, and the like, must often be configured to satisfy a user's preferences and/or to comport to a context (e.g., time zone utilized in, updates required, etc.). Generally, most devices allow configuration on the device itself via interaction with a display screen, virtual or physical buttons, or another external device such as a web browser, smart phone app, etc.

BRIEF SUMMARY

In summary, one aspect provides a method, comprising: receiving, at the information handling device, a request to access a user profile; identifying, using a processor of the information handling device, a presence of at least one other device; requesting, from the at least one other device, configuration information, wherein the configuration information is associated with login information to the user profile; and receiving, at the information handling device, the configuration information.

Another aspect provides an information handling device, comprising: a processor; a memory device that stores instructions executable by the processor to: receive a request to access a user profile; identify a presence of at least one other device; request, from the at least one other device, configuration information, wherein the configuration information is associated with login information to the user profile; and receive, at the information handling device, the configuration information.

A further aspect provides a method, comprising: identifying, using a processor of an information handling device, a presence of at least one other device; requesting, from the at least one other device, configuration information; receiving, at the information handling device, the configuration information; and configuring, responsive to the receiving, one or more settings on the information handling device.

Yet a further aspect provides an information handling device, comprising: a processor; a memory device that stores instructions executable by the processor to: identify a presence of at least one other device; request, from the at least one other device, configuration information, wherein the configuration information is associated with device setting data; receive the configuration information; and configure, responsive to the receiving, one or more settings on the information handling device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
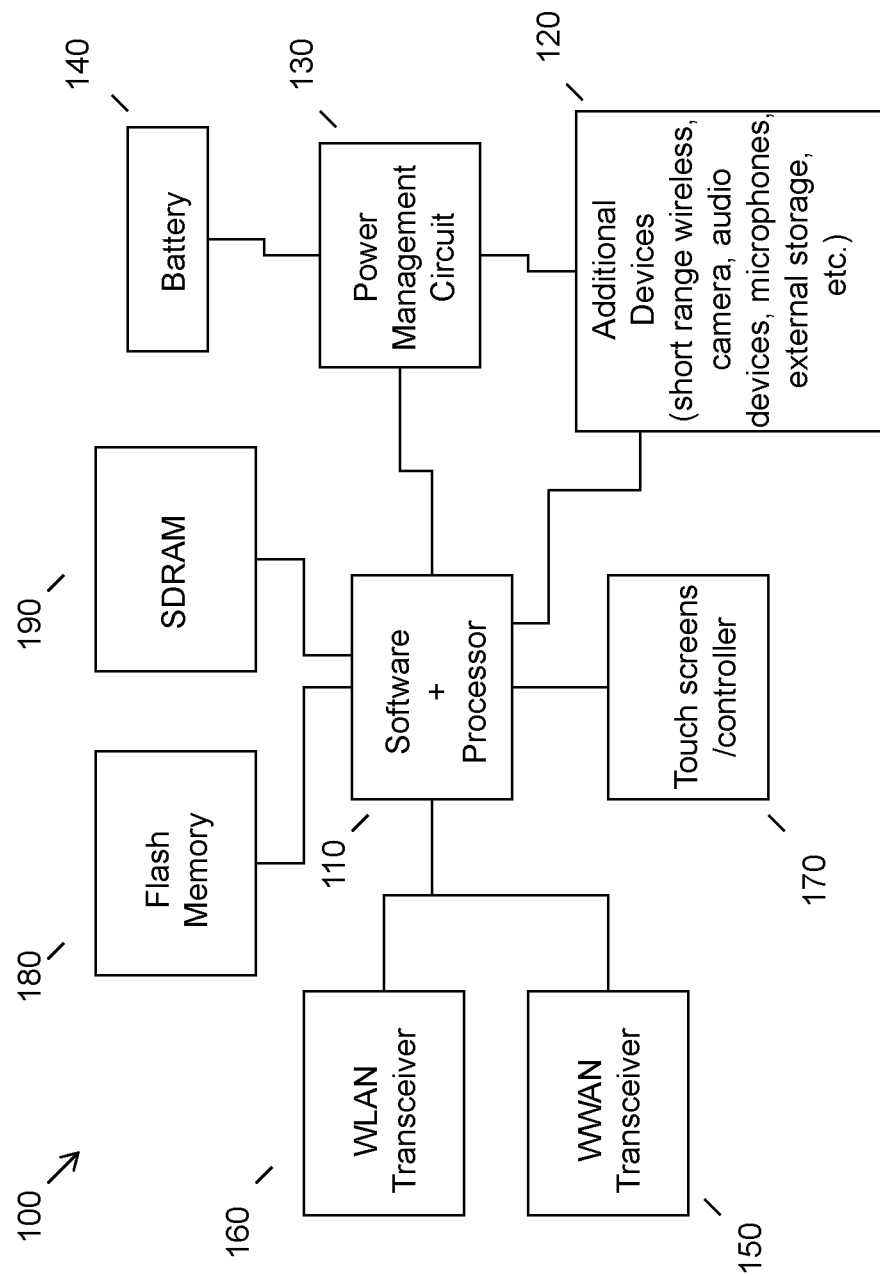
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Generally, when a new device is obtained or introduced into an Internet of Things (IoT) network it must first be configured prior to use. The configuration may be necessary to satisfy a user's preferred settings on the device (e.g., login information, desired home screen, desired input/output modalities, haptic feedback levels, notification methods, time zone preferences, etc.) and/or to satisfy various parameters necessary for smooth operation of the device (e.g., software updates, etc.). Configuration is often conducted by a user via interaction with the device (e.g., using one or more input methods such as keyboard input, touch input, voice input, etc.) or another device capable of communicating with the target device (e.g., a smartphone application, a web browser, etc.).

Conventionally, the configuration of devices must be repeated for each new device. Such a requirement is burdensome and often time-consuming for a user. For example, a user presently is required to provide login information to each video service application available on a digital media player (e.g., Roku®, Amazon Fire TV®, etc.). This requires the user to type in a URL then a password and/or a special code from the device. Such a requirement may be frustrating and may interfere with the media viewing experience. As another example, when a new device is obtained or introduced into an IoT network, a user must spend time manually configuring and adjusting the settings on the new device to comport to their preferences. Such a task may not be intuitive to all users and may lead to frustration.

Accordingly, an embodiment provides a method for automatically receiving login and configuration information from another device. In an embodiment, a request to access a user profile may be received at a first device. The user profile may be associated with a device, an application, etc.

An embodiment may thereafter request login information associated with the user profile from one or more other devices. Responsive to receiving the login information from the other devices, an embodiment may be able to access the user profile. Additionally, an embodiment may also receive configuration information from one or more other devices. In an embodiment, a device may automatically identify the presence of at least one other device and thereafter request configuration information from these devices. Responsive to receiving the configuration information, an embodiment may configure one or more settings on the information handling device. Such techniques may prevent interruptions to the media experience by minimizing the user's involvement in the login and device configuration processes.

Such a method may therefore inform a user that a non-personal device has recognized a user's identity and is capable of performing user-specific functions and/or loading user-specific settings.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, a thermal sensor, etc. System 100 often includes one or more touch screens 170 for data input and display/rendering. System 100 also typically includes various memory devices, for example flash memory 180 and SDRAM 190.

Figure 2:
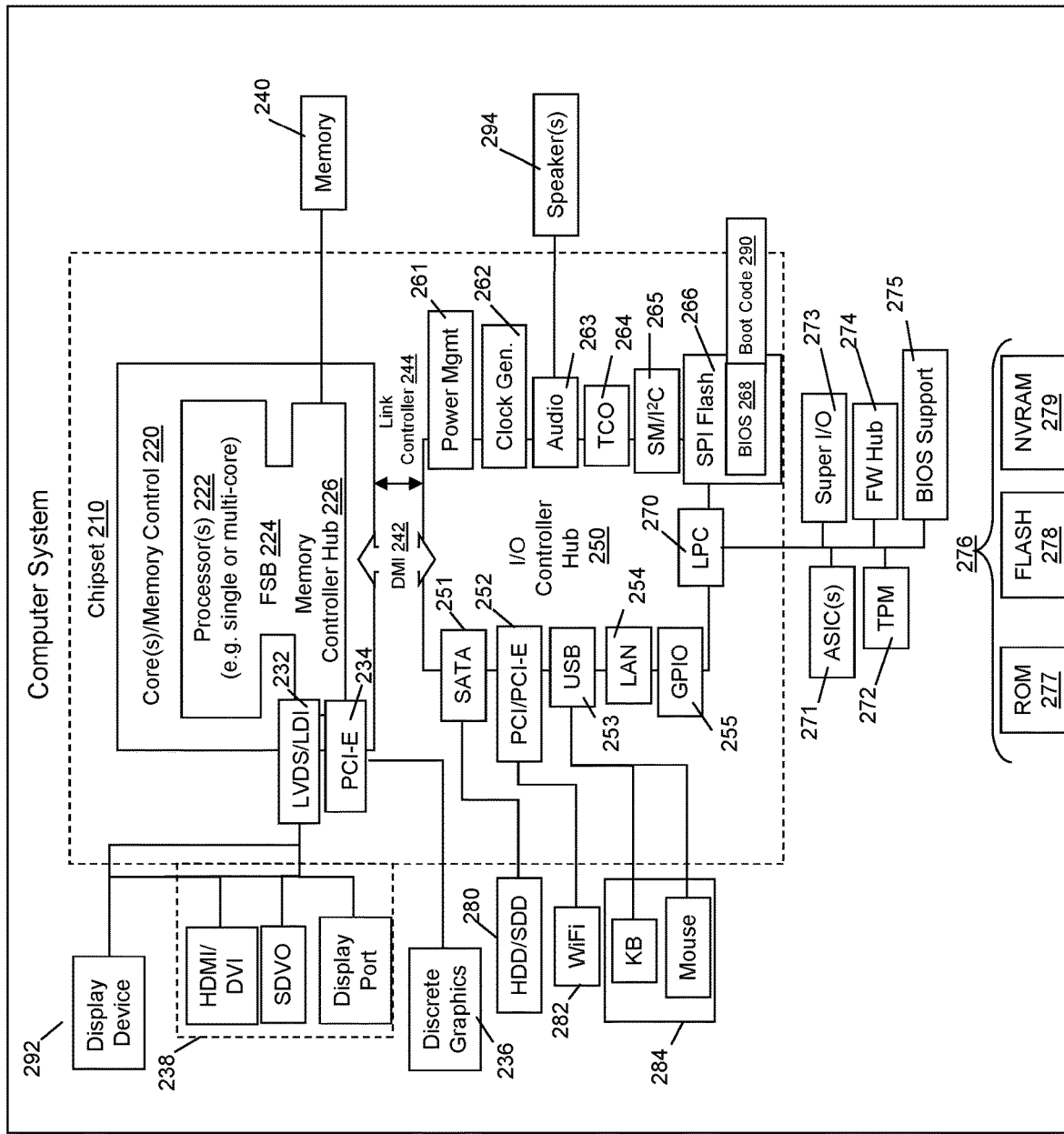
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAIVI 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as smart phones, tablets, smart speakers, smart appliances, personal computer devices generally, and/or electronic devices that are capable of communicating with and transmitting data to other like devices. For example, the circuitry outlined in FIG. 1 may be implemented in a tablet or smart phone embodiment, whereas the circuitry outlined in FIG. 2 may be implemented in a laptop embodiment.

Figure 3:
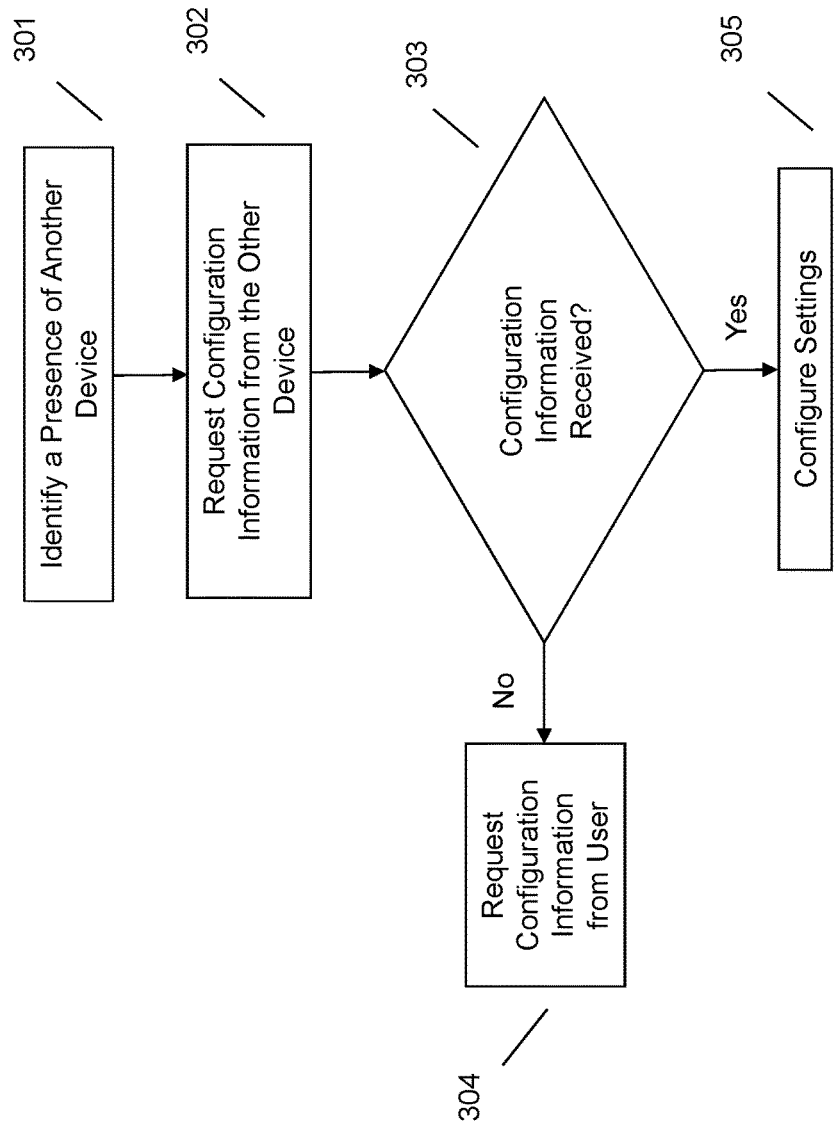
FIG. 3 illustrates an example method of accessing and configuring a device.

Referring now to FIG. 3, an embodiment may automatically receive login and device configuration information from other devices. At 301, an embodiment may identify a presence of at least one other device. In an embodiment, the presence of other devices may be identified using one or more conventional device detection methods known in the art such as wireless detection methods over a network (e.g., using Wi-Fi, etc.), short range device detection methods (e.g., using Bluetooth, etc.), detection using sensor data from other devices, and the like.

At 302, an embodiment may request configuration information from another device. In the context of this application, configuration information may include login information (e.g., username and password for a particular device or application, etc.), setting information (e.g., user preference settings, time setting, GUI settings, notification settings, etc.), and the like. In an embodiment, the request for configuration information may be transmitted using any communication modality available to the device (e.g., WiFi-based communication, short range transmission, etc.).

In an embodiment, the request for configuration information may be associated with a request to receive login information to access a user profile. The user profile may be associated with an application on a device, the device itself, a combination thereof, and the like. For example, a user may want to access their user profile on a video streaming application (e.g., Netflix, Hulu, etc.) from their smart TV. Although the user may not be logged into the user profile on their smart TV, the user may be logged into the profile from another device (e.g., their laptop, smart phone, tablet, etc.). The request may therefore be made to one or more devices that are presently logged into the user profile or have previously been logged into the user profile and have the requisite login information to provide.

In an embodiment, the login information may be requested from all devices within a predetermined threshold distance of the target device. For example, using the foregoing example, an embodiment may request login information from all devices within 15 feet of the smart TV or located in the same room as the smart TV. In another embodiment, the login information may be requested from all devices that are connected to a network. For example, an embodiment may request the login information from any IoT device connected to an IoT network, regardless of physical proximity to the smart TV. In another embodiment, an embodiment may determine which devices comprise the login information and thereafter only request the login information from those devices. Stated differently, in lieu of querying every device within a predetermined distance, any device connected to a network, etc., an embodiment may only query those devices that have indicated they comprise the login information.

In an embodiment, the request for configuration information may be associated with a request to receive device setting data. As previously mentioned, device setting data may be related to time data, user notification methods, GUI layout, update schedule, etc. An embodiment may attempt to receive device setting data from other devices without receiving additional user input. That is, an embodiment may receive setting data on a device without a user manually adjusting the settings on the device.

In an embodiment, only the device settings determined to be the most common across a predetermined number of devices may be transmitted. For example, an embodiment may take an accounting of the settings resident on each device in an IoT network. An embodiment may thereafter only transmit those settings to the new device that are shared among a predetermined number (e.g., half, three-fourths, etc.) of the devices in the IoT network. For instance, if six devices constitute an IoT network and a specific notification setting is prevalent on five out of the six devices, data indicative of the notification setting may be transmitted to the new device. However, if only two of the six devices contain a specific notification setting, then that notification setting may not be transmitted to the new device. In an embodiment, if an update to the device setting data is received at the other devices, this update may automatically be transmitted to the new device. For example, if updates to the notifications settings have been received on the other devices, an indication of the updated notification settings may be transmitted to the new device.

At 303, an embodiment may receive configuration information. The configuration information may be transmitted from another device to the device using any available transmission modality. Responsive to receiving the configuration information, at 303, an embodiment may configure, at 305, one or more settings on the device. In an embodiment, the configuration of the one or more settings may occur with the receipt of minimal additional user input (e.g., a user providing confirmation input that a device may proceed with a setting change, etc.). Alternatively, the configuration of the one or more settings may occur automatically without receiving any additional user-provided configuration input. Responsive to not receiving any configuration information (e.g., because none of the devices have any configuration information to transmit or are not capable of transmitting configuration information, etc.), an embodiment may request, at 304, that a user provide manual configuration information.

In an embodiment, responsive to receiving login information, at 303, an embodiment may access, at 305, a user profile. In an embodiment, the received login information may be used to populate any username/password input fields. Alternatively, an embodiment may receive the login information and simply provide instant access to the user profile, without displaying any login screen. Once the user profile is accessed, all content on the user profile and any commands executable by the user profile are available to the user. For example, responsive to logging into a user profile on a digital media player, a user may have access to all authorized media content available on that user profile. In another example, responsive to logging into a user profile on a digital assistant device, a user may have access to all authorized commands executable by the digital assistant for that profile. In an embodiment, responsive to receiving device setting data from the other devices, an embodiment may change one or more of the settings on the new device.

In an embodiment, user characteristic data may also be received at the device. The user characteristic data may identify a personality type of a user, habits of the user (e.g., investing, etc.), location of the user, etc. For example, the user characteristic data may identify a user as tech savvy, fitness oriented, interested in a particular hobby, etc. In an embodiment, the user characteristic data may be collected by and transmitted from the same devices that transmit the configuration information or may be collected by and transmitted from other devices, sensors, applications (e.g., calendar applications, social media applications, emails, etc.), and the like. In an embodiment, the user characteristic data may be received in concurrence with the configuration information or may be received at another time (e.g., before or after the configuration information is transmitted, etc.).

In an embodiment, the user characteristic data may be utilized and considered during the configuration of the settings on a device. For example, responsive to receiving user characteristic data that a user is fitness oriented, an embodiment may optimize a home screen to display various health based applications (e.g., daily calorie counter, daily step counter, etc.) and/or adjust notification settings based upon suggested workout times, etc. In another example, responsive to receiving user characteristic data that a user is tech savvy, certain menu items may be shown, prioritized, or eliminated for tech savvy users that non-tech users would not care about. In yet another example, the user characteristic data may provide an indication of location of a user (e.g., home, work, etc.) and thereafter adjust one or more settings based upon that location information. For instance, a user's device may be configured in a more conservative and professional way when it is detected that they are at work (e.g., volume off, blank home screen, business applications prioritized over gaming and social media applications, etc.) and configured in another, more liberal, way when it is detected that they are at home (e.g., volume on, colorful home screen, social media and gaming applications prioritized over business applications, etc.).

The various embodiments described herein thus represent a technical improvement to conventional techniques for accessing and configuring a device. Using the techniques described herein, an embodiment may identify a presence of at least one other device. An embodiment may thereafter request configuration information of the other device. The configuration information may be login information to a user profile, setting information, a combination thereof, and the like. Responsive to receiving the configuration information, an embodiment may configure one or more settings on the device. The configuration may be conducted with the receipt of minimal additional user input or may be conducted without the receipt of any additional user input. Such a method may make the configuration of settings on new devices introduced into a user's device network more streamlined.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    receiving, at an information handling device, a request to access a user profile;
    identifying, using a processor of the information handling device, a presence of at least one other device;
    determining, using a processor and without additional user input, which of the at least one other device contains configuration information, wherein the configuration information is associated with login information to the user profile and wherein the determining comprises receiving, from at least a subset of the at least one other device, an indication of knowledge of the configuration information;
    requesting, from the at least the subset, the configuration information, wherein the requesting comprises requesting the configuration information from the at least one other device determined to be within a predetermined threshold; and receiving, from the at least the subset and at the information handling device, the configuration information.

2. The method of claim 1, wherein the configuring the one or more settings comprises accessing the user profile responsive to receiving the login information.

3. The method of claim 1, wherein the user profile is associated with at least one of an application and a device.

4. An information handling device, comprising:
a processor;
a memory device that stores instructions executable by the processor to:
receive a request to access a user profile;
identify a presence of at least one other device;
determine, without additional user input, which of the at least one other device contains configuration information, wherein the configuration information is associated with login information to the user profile and wherein the determining comprises receiving, from at least a subset of the at least one other device, an indication of knowledge of the configuration information;
request, from the at least the subset, the configuration information, wherein the requesting comprises requesting the configuration information from the at least one other device determined to be within a predetermined threshold; and
receive, from the at least the subset and at the information handling device, the configuration information.

5. The information handling device of claim 4, wherein the instructions executable by the processor to configure the one or more settings comprise instructions executable by the processor to access the user profile responsive to receiving the login information.

6. A method, comprising:
identifying, using a processor of an information handling device, a presence of at least one other device;
determining, using a processor and without additional user input, which of the at least one other device contains configuration information, wherein the determining comprises receiving, from at least a subset of the least one other device, an indication of knowledge of the configuration information;
requesting, from at least a subset, the configuration information, wherein the requesting comprises requesting the configuration information from the at least one other device determined to be within a predetermined threshold;
receiving, from the at least the subset and at the information handling device, the configuration information; and
configuring, responsive to the receiving, one or more settings on the information handling device.

7. The method of claim 6, wherein the receiving comprises receiving the configuration information determined to be most common across a predetermined number of the at least one other device.

8. The method of claim 6, further comprising receiving, after the configuring, updated configuration information responsive to identifying that settings on the at least one other device have changed.

9. The method of claim 6, further comprising receiving context data associated with a user of the at least one other device.

10. The method of claim 9, wherein the configuring comprises configuring the one or more settings using the context data.

11. The method of claim 6, wherein the configuring comprises configuring without receiving additional user-provided configuration input.

12. An information handling device, comprising:
a processor;
a memory device that stores instructions executable by the processor to:
identify a presence of at least one other device;
determine, without additional user input, which of the at least one other device contains configuration information, wherein the configuration information is associated with device setting data and wherein the determining comprises receiving, from at least a subset of the at least one other device, an indication of knowledge of the configuration information;
request, from the at least the subset, the configuration information, wherein the requesting comprises requesting the configuration information from the at least one other device determined to be within a predetermined threshold;
receive, from the at least the subset, the configuration information; and
configure, responsive to the receiving, one or more settings on the information handling device.

13. The information handling device of claim 12, wherein the instructions executable by the processor to receive comprise instructions executable by the processor to receive the configuration information determined to be most common across a predetermined number of the at least one other devices.

14. The information handling device of claim 13, wherein the instructions executable by the processor to configure comprise instructions executable by the processor to configure the one or more settings using the context data.

15. The information handling device of claim 12, wherein the instructions are further executable by the processor to receive context data associated with a user of the at least one other device.

16. The information handling device of claim 12, wherein the instructions executable by the processor to configure comprise instructions executable by the processor to configure without receiving additional user-provided configuration input.

* * * * *